(12) United States Patent
Darisi et al.

(10) Patent No.: US 8,004,994 B1
(45) Date of Patent: Aug. 23, 2011

(54) SYSTEM AND METHOD FOR INTELLIGENTLY ANALYZING PERFORMANCE OF A DEVICE UNDER TEST

(75) Inventors: Prashant Darisi, Nashua, NH (US); Jeremy Spilman, Shirley, MA (US); Jose Graziani, Shrewsbury, MA (US)

(73) Assignee: Azimuth Systems, Inc., Acton, MA (US)

( * ) Notice: Subject to any disclaimer, the term of this patent is extended or adjusted under 35 U.S.C. 154(b) by 699 days.

(21) Appl. No.: 11/555,324

(22) Filed: Nov. 1, 2006

(51) Int. Cl.
*H04J 3/14* (2006.01)

(52) U.S. Cl. ........................................ 370/241

(58) Field of Classification Search .............. 370/230, 370/231, 232, 235, 236, 241.1, 242, 245, 370/247, 248, 253, 277, 395.65, 395.7, 395.71, 370/395.72, 516, 519, 252, 395.6; 714/748
See application file for complete search history.

(56) References Cited

U.S. PATENT DOCUMENTS

| | | | |
|---|---|---|---|
| 2002/0095636 A1* | 7/2002 | Tatsumi et al. | 714/748 |
| 2003/0133458 A1* | 7/2003 | Sato et al. | 370/395.6 |
| 2005/0068900 A1* | 3/2005 | Stephens et al. | 370/252 |
| 2006/0012388 A1* | 1/2006 | Lin et al. | 324/750 |
| 2006/0120283 A1* | 6/2006 | Poetker et al. | 370/230 |
| 2006/0274657 A1* | 12/2006 | Olgaard et al. | 370/235 |

* cited by examiner

*Primary Examiner* — Kevin C Harper
*Assistant Examiner* — Leon Andrews
(74) *Attorney, Agent, or Firm* — Anderson Gorecki & Manaras LLP

(57) ABSTRACT

A method and apparatus is provided that enables accurate measurement of drop rate and delay in a System Under Test (SUT) by one or more monitoring devices even when the frame error rate of the monitoring devices may be imperfect. During a packet drop measurement process, ancillary information is identified and analyzed to determine if the ancillary information can be used to infer receipt of packets when explicit information regarding receipt is not present. A delay measurement process incorporates the time required to re-transmit packets into the delay measurement to more accurately reflect SUT operation.

13 Claims, 5 Drawing Sheets

SYSTEM AND METHOD FOR INTELLIGENTLY ANALYZING PERFORMANCE OF A DEVICE UNDER TEST

FIELD OF THE INVENTION

This invention relates generally to the field of network monitoring and more particularly to a system and method for intelligently monitoring operation of communication devices.

BACKGROUND OF THE INVENTION

New wireless technology is being developed and deployed to support voice and multimedia services in both residential and enterprise environments. Wireless Local Area Network ("WLAN") devices, for example, are being developed in conjunction with IEEE 802.11 standards to support packetized voice communications such as Voice over Internet Protocol ("VoIP") over Wi-Fi. There are technological hurdles that must be overcome in order to support voice, video, video teleconferencing, remote display, gaming and other multimedia applications on WLANs because the WLAN technology was initially designed to support simple data communications. In particular, voice and multimedia applications can be more sensitive to jitter, delay and packet loss than data communications applications. It is therefore important that wireless devices be tested to verify their ability to support VoIP and other multimedia applications prior to network deployment.

Testing typically involves monitoring, capturing and analyzing traffic that is exchanged between a pair of communication nodes to quantify the performance of the network devices. One characteristic that is used to measure the performance of the network devices is the packet drop rate of the devices. The packet drop rate identifies a percentage of packets that are received with errors or not received at all by the device. Another characteristic of a network node that requires accurate measurement is the delay through the device or network of devices and the transmission medium, and how the delay is affected by environmental conditions. A third characteristic which is measured is the jitter of a system, wherein the jitter is the variation in delays between successive packets. Devices which receive VoIP communications are particularly sensitive to packet loss, delay and jitter, and it is therefore important that the drop rate, delay and jitter of VoIP devices be accurately measured. The packet drop rate, delay and jitter characteristics of a network are directly related to the quality of service that can be provided to voice, video and other multi-media applications. The measured performance characteristics therefore give and indication of the quality of service that can be provided by a system under test.

One problem with accurately determining the drop rate characteristic of a device is that the monitoring devices are also subject to packet loss. When capturing traffic for analysis of network conditions or device performance, the monitor's receiver sometimes receives frames with errors or loses them altogether. Since monitoring equipment uses the same radio or receiver technology as the devices it is monitoring, such loss of frames is a common problem. A monitoring device may fail to detect receipt of a packet that is accurately received by the device under test (DUT), and characterize the packet as a dropped packet erroneously. A monitoring device that erroneously identifies a packet as dropped mischaracterizes the performance of the device under test. It is desirable to increase the accuracy of packet drop rate measurements to minimize mischaracterization of DUT performance.

Packet delay measurement involves identifying the amount of time it takes a packet to propagate or be forwarded between one point in the network and another. One problem with delay measurements, however, is that they do not typically include delays associated with re-transmissions of the packet. The number of retransmissions may vary based on network conditions and how the device reacts to environmental conditions, such as external traffic and noise. The present invention realizes that retransmissions are part of the delay that has to be measured and that an accurate delay measurement should be measured from first transmission to a good packet reception.

SUMMARY OF THE INVENTION

The present invention takes advantage of an acknowledgement feature of communication protocols to validate packet drops to prevent mischaracterization of the performance of a device under test. In some communication protocols, such as IEEE 802.11, a device that receives a packet indicates receipt of the packet by immediate forwarding of an acknowledgement to the sender. In the present invention, a source monitor that monitors operations of a source Device Under Test (DUT) maintains a record of acknowledgements sent to the source DUT. As will be described in further detail below, the acknowledgement records are used to validate that a packet that is deemed by the monitor as a dropped packet was actually dropped.

According to one aspect of the invention, when measuring a packet drop rate of a system under test (SUT), a source monitor maintains a source list of packets that are forwarded by a source DUT to a destination DUT. A destination monitor maintains destination list of packets that are sent to the destination Device Under Test (DUT). The source list and destination list are compared to identify packets that were recorded by the source monitor as sent by the source DUT but do not appear in the destination list. Any packet that appears in the source list but does not appear in the destination list is stored in a dropped packet list. In a second phase of the invention, referred to as a validation process, the dropped packet list is validated to ensure that the packets that are identified as dropped were dropped by the destination DUT, and not by the destination monitor. Acknowledgement records in the source monitor are examined to determine whether an acknowledgement was sent from the destination DUT for each packet that is in the dropped packet list. If an acknowledgement was received for a packet that is in the dropped packet list, the acknowledgement provides inferential evidence of receipt of the packet by the destination DUT, and the packet can be removed from the dropped packet list.

Such an arrangement remedies errors caused by performance issues of the monitoring device and enables a complete and accurate measurement of DUT drop rate performance to be attained.

According to another aspect of the invention, the source list and acknowledgement records can also be used to provide a delay measurement having increased accuracy. When calculating delay measurements using the present invention, the source list can be used to identify a first transmission and subsequent retransmissions of a packet that is eventually acknowledged by the destination DUT. The delay measurement of the present invention associates a first transmission of a packet with an acknowledgement of the packet, even if the acknowledgement is associated with a re-transmission of the original packet to provide a delay measurement having increased accuracy.

Jitter is the variation in delay from packet to packet. The delay measurements of the present invention may be used to provide jitter measurements having increased accuracy.

These and other advantages of the invention will be described with regard to the below figures.

DETAILED DESCRIPTION

The present invention includes a system and method for intelligently analyzing captured traffic using ancillary information associated with packet receipt to infer the receipt of packet when explicit information of receipt is not available. The ancillary information can be used when actual receipt of a packet is not detected to identify and remedy frame errors of a monitor. In one embodiment, the ancillary information includes a communication protocol acknowledgement message (ACK) provided from the DUT indicating receipt of a packet, and receipt of a packet is inferred based on the receipt of an acknowledgement when explicit evidence of receipt is not available at the monitor.

According to another aspect of the invention, ancillary information such as a list of packet transmissions and acknowledgements (ACKs) can be used to generate a delay measurement having increased accuracy. A list of packets that are transmitted from a source Device Under Test (DUT) to a destination DUT is evaluated during a delay measurement process to incorporate delay associated with retransmitted packets into the delay measurement.

Figure 1:
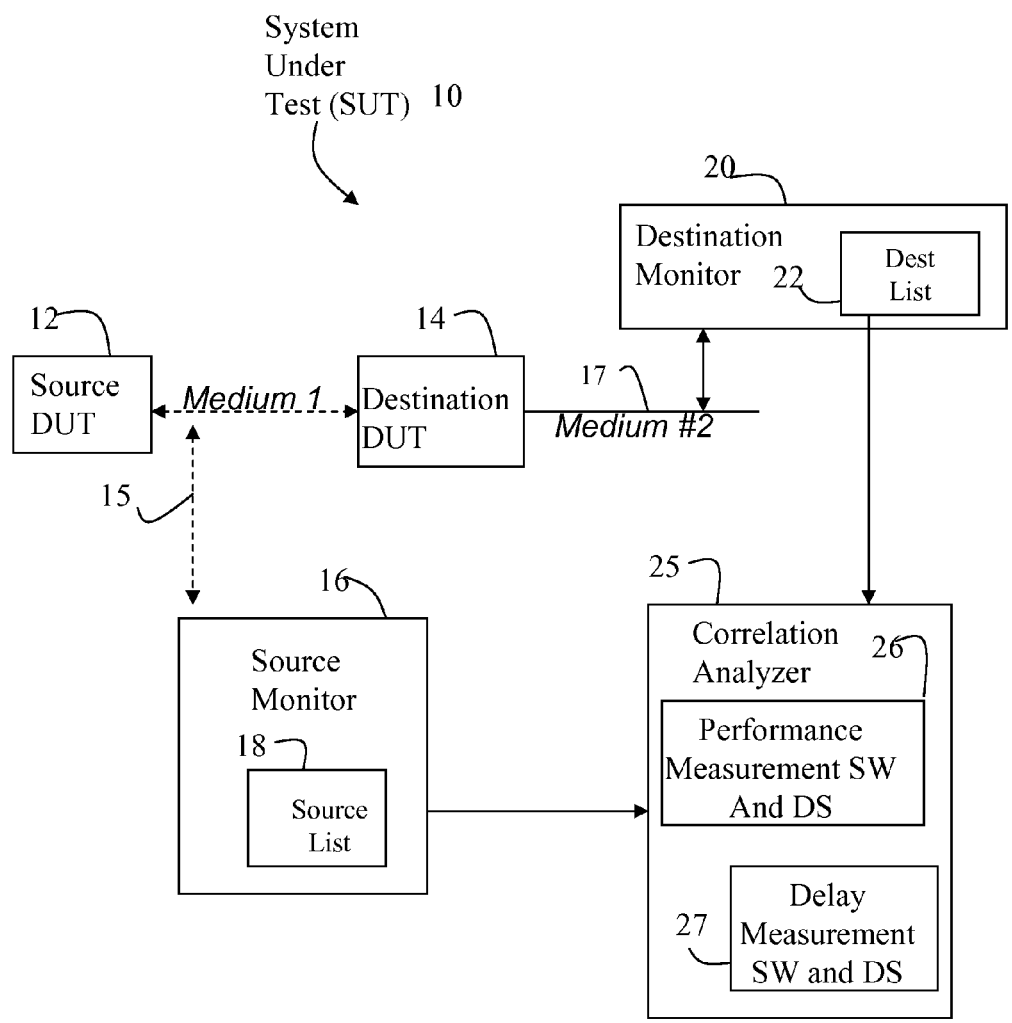
FIG. 1 is a block diagram of a testing system in which the present invention can be used.

Referring now to FIG. 1, a System Under Test (SUT) 10 is provided for monitoring and analyzing traffic that is forwarded from a source device under test (DUT) 12 to a destination DUT 14. As will be described in more detail below, the SUT may be used to measure many communication characteristics of the source DUT and destination DUT including packet loss, delay and jitter measurements. In FIG. 1, the source and destination DUTs communicate over medium #1 (15), which may be, for example, a wireless communication medium, using protocols such as the 802.11 Local Area Network (LAN) protocol, or wire-line medium. The 802.11 LAN protocol specifies the radio frequencies and command response sequences and constraints that enable wireless communication between two devices. The medium 15 (shown in dashed lines in FIG. 1) may be air, or may be a more controlled delivery medium (such as a cable) in a test environment. Although the present invention will be described in the context of the 802.11 protocol, it will be appreciated that the concepts of the present invention may easily be extended for use with other wireless and wire-line protocols, and the present invention is not limited to validating any particular communication protocol.

The source DUT 12 is therefore any device that is capable of transmitting data to the destination DUT over the selected medium using the selected protocol. For example, in one embodiment the source 12 may be a wireless station (STA), the destination DUT may be a wireless access point (AP) and the two may communicate using the 802.11 WiFi protocol.

Access points are used to couple a WLAN to another network that could be LAN or Wide Area Network (WAN). In the exemplary embodiment of FIG. 1, the destination DUT couples source 12 to medium #2 which is a wire-line network that uses an Ethernet protocol.

In an exemplary test environment such as that of FIG. 1, the source DUT 12 may provide traffic for validating operation and measuring performance of the system under test (SUT) consisting of source and destination DUTs 12 and 14. The traffic may be data traffic, VoIP traffic, video traffic, etc. A source monitoring device 16 captures transmissions associated with the source DUT 12. Although the source monitor 18 is shown as a separate entity, it can be appreciated that for the purpose of packet drop measurements, it may be integrated with the destination monitor 20 and/or with the correlation analyzer 25. For delay measurements it may be desirable to separate the source and destination monitors, so that they are near to their respective DUTs in order not to bias the delay calculations, although either one may include correlation analyzer functionality.

The source monitor 16 includes a source list 18, which records packets that are transmitted by the source DUT 12 to the destination DUT 14. As will be described in more detail below, the source monitor also maintains a record of acknowledgements that are transmitted by the destination DUT to the source DUT. The acknowledgement is an indication that is forwarded by the destination to the source, indicating receipt of the packet. A destination monitor 20 is coupled to medium #2 (17). In an exemplary test environment, all traffic from both the source 12 and destination DUT on medium #1 (15) is captured by the source monitor and all the traffic forwarded by the destination DUT on medium#2 (17) is captured by the destination monitor 20. The destination monitor 20 maintains a destination list 22, which is a record of each packet that is captured on medium #2. In a system without faults, the destination list would list every packet that is received by the destination DUT 14. Although the destination monitor is shown as a separate entity, it is appreciated that in other embodiments the destination monitor may be incorporated into the source monitor and correlation analyzer 25.

Correlation Analyzer 25 represents a combination of hardware and software for analyzing captured traffic to characterize the operation and performance of the SUT. An exemplary analyzer may include a Voice over IP WiFi Test Suite (Vo-WiFi) executing on a W-Series test platform provided by Azimuth Systems, Inc. of Acton Mass. or equivalent. It should be understood that the concepts of the present invention also may advantageously be used in other environments in addition to test environments, and the invention is not limited to any particular use.

According to one aspect of the invention, an analyzer includes a performance measurement software and data structures 26 which are used for measuring a drop rate probability with improved accuracy. The correlation analyzer may also include delay measurement software and data structures 27 which are used to measure the delay of a SUT as will be described later herein. The performance measurement software compares the source list 18 of source monitor 16 against the destination list 22 of destination monitor 20 to identify gaps in the destination list which may indicate the potential loss of a packet and may include packet retransmissions associated with delayed packet delivery.

Drop Packet Measurement and Validation Process

Figure 2:
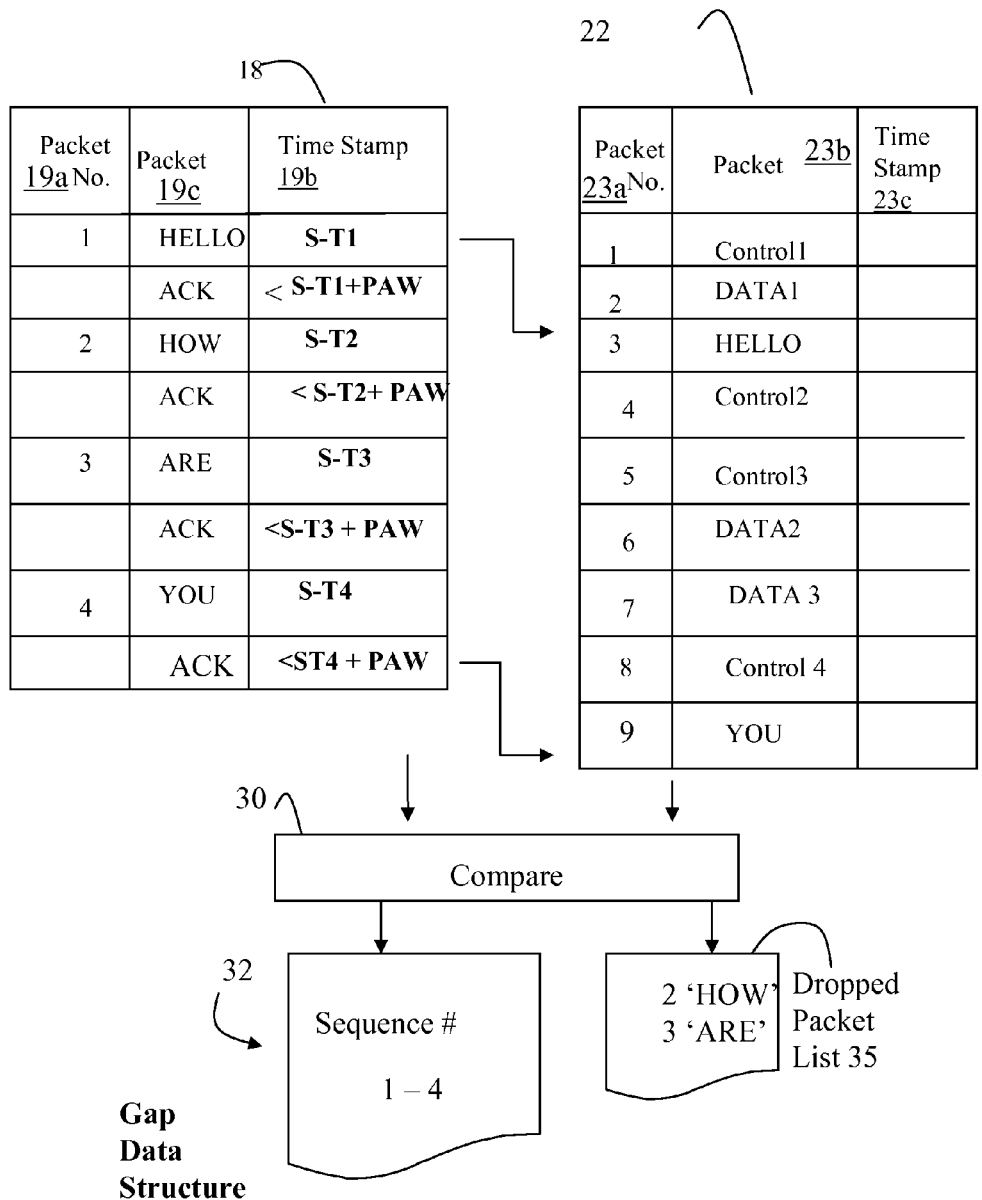
FIG. 2 illustrates several data structures that are maintained in the present invention for use in validating dropped packets.

FIG. 2 illustrates exemplary formats and content of a source list 18, a destination list 22, a dropped packet list 23 and a gap data structure 32 of the present invention. The source list is maintained by the source monitor and is shown to include a numbered list of packets that comprise transmit traffic sent by the source DUT 12 and ACKs or any other traffic sent by the destination DUT on medium #1. The source list may include a mechanism for tracking the packets and an indication of packet content. In the example of FIG. 2, the mechanism for tracking the packet includes a packet sequence number 19a and a packet time-stamp 19b. The packet sequence number is a number that is assigned to a packet at transmission. The packet time stamp identifies a time when the packet is received by the monitor. The source list may also store the packet content 19c.

The destination list 22 is maintained by the destination monitor 20 and is shown to include a sequence number 23a, packet content 23b and a time stamp 23c. During testing of a SUT it is often desirable to test the device in a real-time wireless environment. Such an environment may include wireless traffic from other devices, as well as the environmental interference. In the test environment, the other traffic may be simulated by test equipment or provided by real network devices. The destination list will therefore include packets in addition to those provided by the source device 12. Thus, packet 1 from source 12 corresponds, packet 3 ('YOU') on the destination list, packet 4 on the source list corresponds to packet 9 ('YOU') on the destination list and so on.

When determining whether the destination DUT received the packet, in a first phase of analysis the correlation analyzer 25 performs a bit-wise comparison of the contents of each captured packet to identify packet 'matches'. The matches explicitly show the receipt of the packet by the destination monitor. Using the example of FIG. 1, the destination list is searched for a packet matching packet 1, or 'HELLO.' Once HELLO is found in the destination list, the list is searched for the 'HOW' packet, the second packet of the VoIP transmission. If no matching 'HOW' packet is found, the destination list is searched for the next locatable packet of the VoIP communication. In the example of FIG. 2, the next locatable packet is the packet for the "YOU' communication, which is detected as packet 9 in the destination list.

When a packet is not found on the destination list, it is characterized as a dropped packet. A gap data structure 32 stores the sequence numbers of packets surrounding each gap. For example, in FIG. 2 the gap data structure stores sequence numbers for packets 1 and 4, which are both found on the destination list. A dropped packet list 35 is also populated with packets that are in the source list but do not have a match in the destination list.

The dropped packet list 35 now stores all packets for which no explicit match can be found on the destination list of the destination monitor. During a validation phase of the present invention, packets in the dropped packet list are validated by analyzing ancillary information in the source list, such as acknowledgements to determine whether receipt of the dropped packets can be inferred.

During the validation phase of analysis, the portion of the source list identified by the sequence numbers of each gap in the data structure is re-visited to see if an acknowledgement was received for a packet that is on the dropped packet list.

As described above, each acknowledgement that is received by the source is stored in a gap entry with the potentially dropped packet. The acknowledgement is an indication that is forwarded by the destination to the source, indicating receipt of the packet. Many protocols that guarantee delivery of packets require that an acknowledgement of receipt be received by the source within a minimum time window, referred to hereinafter as a Protocol Acknowledgement Window (PAW). If no acknowledgement is received, the source will continue to re-transmit the packet until an acknowledgement is received or until re-transmit limit is reached. The present invention uses the acknowledgement records and time stamps included in the source list portion identified by the gap entry to correlate acknowledgements with packets transmitted by the source to determine if a potentially dropped packet was, in fact, dropped by the destination DUT. In the example of FIG. 2, a gap entry identifies a gap between sequence numbers 1 and 4. The correlation analyzer steps through the source list after sequence number 1, locating a 'HOW' packet (sequence number 2) sandwiched between two Acknowledgments. The 'HOW' packet was transmitted by the source at time S-T2, and an ACK was received by the source at a time which is less that S-T2+PAW. Thus in can be inferred that the Acknowledgement is associated with the 'HOW' packet. Even though the 'HOW' packet does not appear in the Destination list, it was fact received by the destination DUT, which forwarded an acknowledgement to indicate receipt. Packet sequence number 2 ('HOW') is thereafter removed from the dropped packet list. The process continues to step through the list, and determines that an acknowledgement was also received for the 'ARE' packet within the PAW. Thus it is the destination monitor, not the destination DUT, which dropped packets 2 and 3. Accordingly the information received at the source monitor can be used to infer receipt by a destination DUT of a packet, to provide a more accurate measurement of SUT performance.

Figure 3:
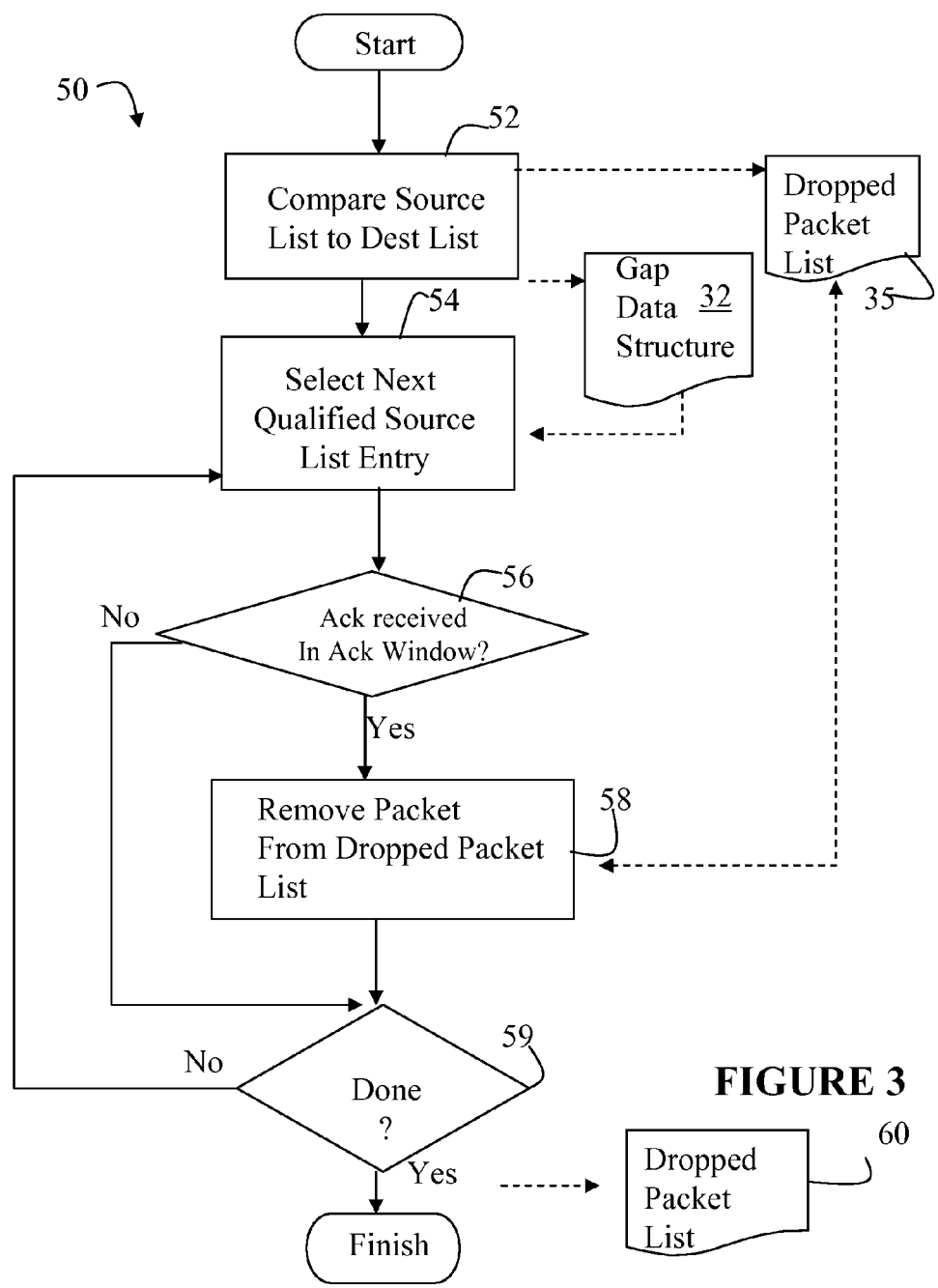
FIG. 3 is a flow diagram that illustrates several exemplary steps of a process that may be performed by a correlation analyzer operating in the test system of FIG. 1.

FIG. 3 is a flow diagram including exemplary steps such as those described above that may be performed in a process 50 of the correlation analyzer of the present invention that measures packet drop rate. At step 52, during a first analysis phase a bit-wise compare is performed between packets in the source list and packets in the destination list. A gap data structure 32 is generated, as described above, where the gap data structure may store a number of 'gap' entries that identify sequences of packets that are in the source list but not found in the destination list. A dropped packet list 35 is also populated, where the dropped packet list includes all packets that are in the source list but not found in the destination list. At step 54 the validation of the dropped packet list is initiated. The next qualified packet in the source list is retrieved. A qualified packet includes an originally transmitted packet or a retransmitted version of the packet that was retransmitted due to failure to receive an acknowledgement within the PAW. When the next qualified packet is obtained, acknowledgement records are examined at step 56 to determine if an acknowledgement was received within the PAW for the packet. If it is determined at step 56 that an acknowledgement was received within the PAW, at step 58 the packet is removed from the dropped packet list. If an acknowledgement is not received within the PAW, the packet remains on the dropped packet list since neither explicit nor inferential evidence can be found to show receipt of the packet, and the process returns to retrieve the next qualified packet. The process proceeds to step 59, where it is determined whether every gap has been evaluated. Once every gap has been analyzed, the process is complete and the dropped packet list is determined to be valid.

Delay Measurement

In addition to providing accurate drop rate measurements, aspects of the present invention may also be used to ensure that delay measurements are appropriately calibrated. A delay is the amount of time it takes for a destination device to receive the packet transmitted from the source device or to forward the packet to another port. The delay thus includes the amount of time that it takes for the destination DUT to receive a packet at an input port and forward it over the output port, but it also must take into account the number of retransmissions by the source DUT that are needed before the destination DUT acknowledges receipt of the packet. The retransmissions may be caused as a result of overloading of the destination DUT or as a result of physical layer impairments causing error in the receiver radio.

The present invention enables accurate delay measurement when a packet is re-transmitted by the source, for example if the source does not receive an ACK within the protocol acknowledgement window. The present invention performs the delay measurements using packet transmission information from the source list and the information in the destination list.

Figure 4:
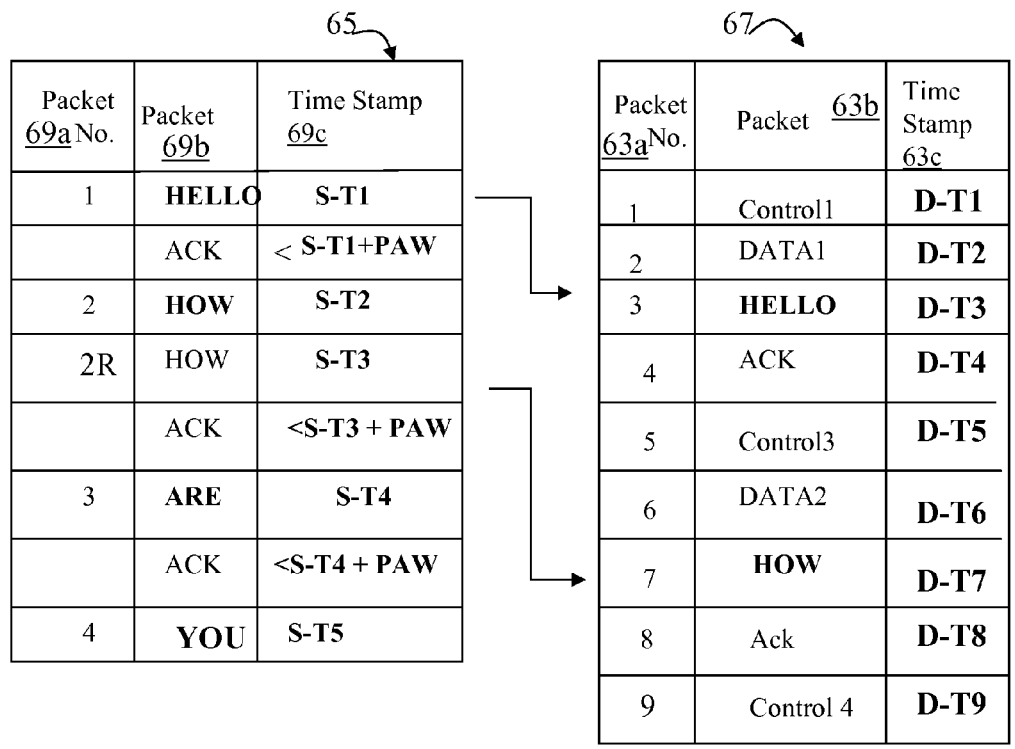
FIG. 4 illustrates several data structures that may be maintained in the present invention to measure delay.

An example of information that may be used in the source and destination lists for measuring delay will now be described with regard to FIG. 4. In FIG. 4, a source list 65 is shown to include a packet sequence number 69a, packet data 69b and a packet time stamp 69c, for example, packet number 1, with contents of 'HELLO' was captured by the source monitor at time S-T1 after source transmission. The 'HELLO' packet is received by the destination DUT at time D-T3. The delay can be measured by subtracting the transmission time from the receive time. (D-T3−S-T1=delay).

Packet 2 'HOW' is transmitted at time S-T2. However, the acknowledgement is not transmitted by the destination DUT until time D-T8. The Acknowledgement is actually generated in response to the retransmitted version of Packet 2 (2R) transmitted at time S-T3, since an acknowledgement was not received in the PAW. According to one aspect of the invention, the delay measurement uses the time stamp of the initially transmitted packet, rather than the retransmitted packet to calculate delay measurements.

Figure 5:
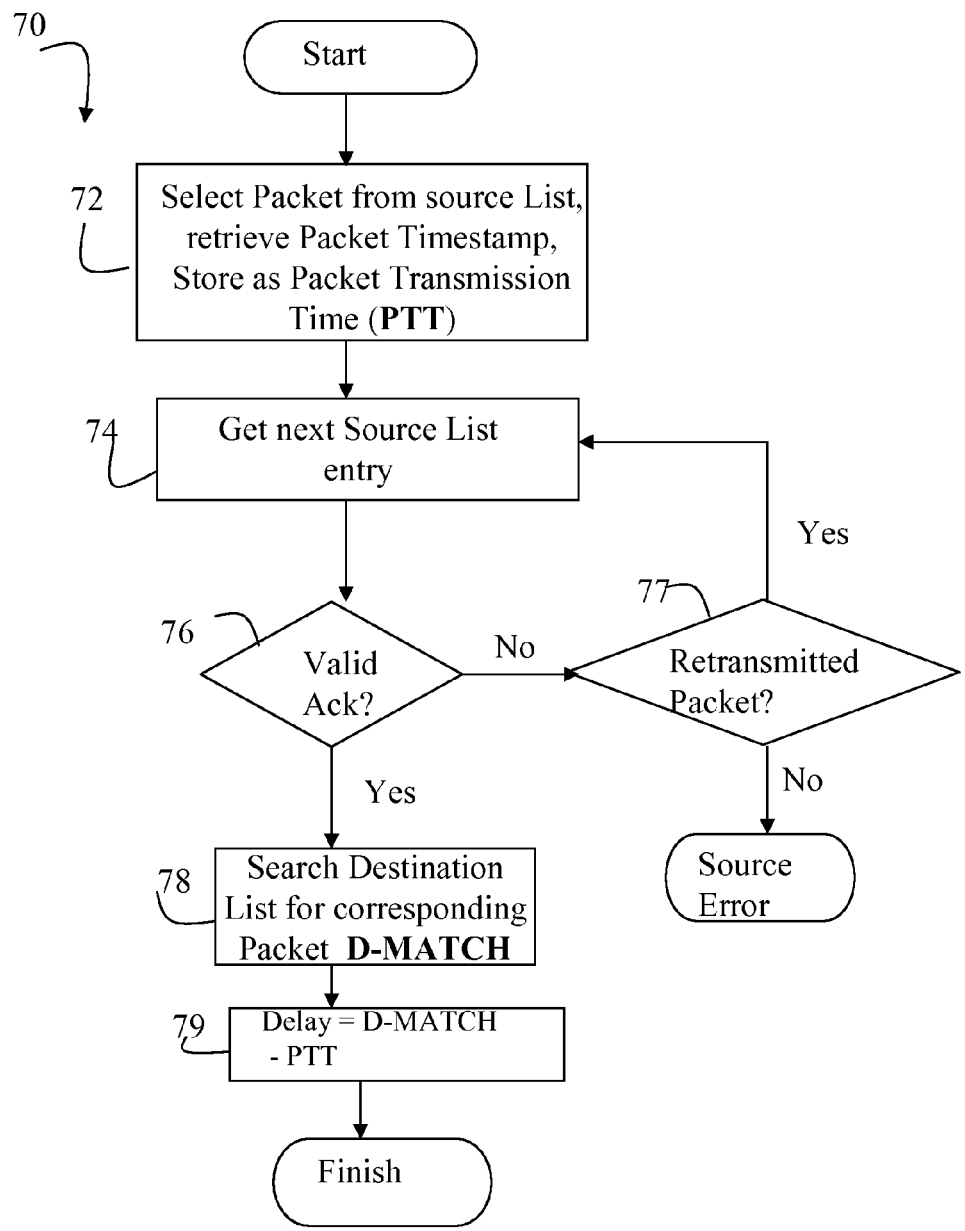
FIG. 5 is a flow diagram provided to illustrate exemplary steps that may be performed to measure the delay of a SUT (system under test) by a correlation analyzer according to the present invention.

FIG. 5 is a flow diagram that illustrates steps that may be performed by a correlation analyzer during a delay measurement process 70. At step 72 a packet is selected from the source list, and the time stamp indicating when the packet was transmitted (Packet Transmit Timestamp (PTT) is obtained. At step 74 the next entry in the source list is retrieved and evaluated. The next entry may be a valid acknowledgement, received within the PAW, or it may be a retransmission of the packet (indicated by a retransmit bit in the packet). At step 76 it is evaluated whether the next entry is an ACK received within the PAW. If so, the destination list is examined to locate the matching entry, and a time stamp of the matching destination D-MATCH is obtained. The delay is then equal to D-MATCH−PTT.

If at step 76 an ACK was not received in the PAW, then at step 77 it is determined whether the packet is a retransmitted version of the original packet. If so, the retransmitted packet is ignored and the process returns to step 74 to retrieve the next packet on the source list. With such an arrangement, the clock for delay measurement starts when the first packet is transmitted, and does not stop until an acknowledgement is issued by the destination DUT. The result is delay measurements that incorporates delay associated with re-transmissions. Jitter, which is variation in delay from packet to packet, is then derived from these delay measurements. Jitter is important to measure in voice streams where regular packet intervals are expected by the destination in order to reconstruct the analog voice signal from the digitized and packetized samples sent over the network.

Accordingly a method and apparatus has been shown and described that enables accurate measurement of drop rate and delay of a SUT by a monitoring device even when the frame error rate of the monitoring device may be imperfect. Ancillary information may be analyzed to identify implicit indications of receipt. Acknowledgement provided in accordance with a selected communication protocol, may be relied upon to overcome the inadequacies of the monitor to provide a more accurate result.

It should be noted that although the invention has been described in the context of wireless communications and the 802.11 WiFi protocol, it is appreciated that the ideas may be adapted to other protocols by one of skill in the art. Thus the present invention is not limited to use with any particular protocol.

Having described various embodiments of the invention, it will be appreciated that many of the above figures are flowchart illustrations of methods, apparatus (systems) and computer program products according to an embodiment of the invention. It will be understood that each block of the flowchart illustrations, and combinations of blocks in the flowchart illustrations, can be implemented by computer program instructions. These computer program instructions may be loaded onto a computer or other programmable data processing apparatus to produce a machine, such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using baseband signaling or broadband signaling techniques, including carrier wave signaling techniques, such as over computer or telephone networks via a modem The above description and figures have included various process steps and components that are illustrative of operations that are performed by the present invention. However, although certain components and steps have been described, it is understood that the descriptions are representative only, other functional delineations or additional steps and components can be added by one of skill in the art, and thus the present invention should not be limited to the specific embodiments disclosed. In addition it is understood that the various representational elements may be implemented in hardware, software running on a computer, or a combination thereof.

While the invention is described through the above exemplary embodiments, it will be understood by those of ordinary skill in the art that modification to and variation of the illustrated embodiments may be made without departing from the inventive concepts herein disclosed. Accordingly, the invention should not be viewed as limited except by the scope and spirit of the appended claims.

The invention claimed is:

1. A method of measuring a quality of service statistic of a system under test (SUT) includes the steps of:
   monitoring traffic exchanged between a Source Device Under Test (Source DUT) and a Destination Device Under Test (Destination DUT), including storing packets of the traffic in a source list;
   monitoring traffic received by the Destination DUT, including storing packets of received traffic in a destination list;
   generating a dropped packet list by comparing the source list and the destination list to identify packets that are in the source list but not in the destination list;
   validating the dropped packet list using ancillary information to determine whether a packet in the dropped packet list was actually received by the Destination DUT;
   calculating the quality of service statistic based on the validated dropped packet list; and
   outputting the quality of service statistic in tangible form.

2. The method of claim 1, wherein the step of monitoring traffic exchanged between the Source DUT and Destination DUT includes the steps of recording acknowledgements received by the Source DUT in response to source packet transmissions, and wherein the ancillary information includes the recorded acknowledgements.

3. The method of claim 2 wherein the Source DUT and the Destination DUT communicate using an 802.11 WiFi protocol, and wherein the acknowledgement is an 802.11 ACK packet.

4. The method of claim 1, wherein the step of validating infers receipt of a packet in the dropped packet list when an acknowledgement is received for the dropped packet by the Source DUT within a protocol acknowledgement window (PAW).

5. The method of claim 4 wherein the step of validating further removes the packet from the dropped packet list when the acknowledgement for the packet is received within the PAW.

6. The method of claim 1 further including the step of generating a gap list, where each gap in the gap list specifies a range of packets that are found on the source list but not on the destination list.

7. The method of claim 6 wherein the step of validating the dropped packet list uses the gap list to identify ancillary information of interest for validating packet drops.

8. An analyzer in a System Under Test (SUT) comprising a computer processor including a computer readable medium having program code stored thereon, the analyzer comprising:
   program code for generating a dropped packet list by comparing a source list of packets exchanged between a Source Device Under Test (Source DUT) and a Destination DUT to a destination list of packets received by the destination DUT to identify packets that are in the source list but not in the destination list;
   program code for validating the dropped packet list using ancillary information of the source list to identify packets that are in the source list but not in the destination list, and were actually received by the Destination DUT;
   program code for calculating a quality of service statistic based on the validated dropped packet list; and
   program code for outputting the quality of service statistic in tangible form.

9. The analyzer of claim 8, further including program code for generating a gap list comprising a plurality of gap entries, each gap entry identifying ancillary information that may be used to determine whether receipt of a packet can be inferred.

10. The analyzer of claim 8, wherein the ancillary information includes an acknowledgement for a packet that is received within a protocol acknowledgement window (PAW).

11. A method of measuring a delay of a System Under Test (SUT) includes the steps of:
   monitoring traffic exchanged between a Source Device Under Test (Source DUT) and a Destination Device Under Test (Destination DUT) including maintaining in a source list a time stamp of each packet transmitted and received by the Source DUT, and maintaining in a destination list a time stamp of each packet transmitted and received by the Destination DUT;
   selecting a packet from the source list including storing a packet transmission timestamp (PTT) for the packet;
   searching the source list to locate a valid acknowledgement associated with the packet, wherein the valid acknowledgement includes an acknowledgement to a re-transmitted version of the packet;
   locating a matching entry in the destination list, the matching entry comprising the retransmitted version of the packet in the destination list, including retrieving a time stamp for the matching entry (D-MATCH);
   computing delay of the packet using the PTT and the D-MATCH and
   outputting the delay of the SUT in tangible form.

12. The method of claim 11 wherein the valid acknowledgement packet is an acknowledgement packet that is received within a Protocol Acknowledgement Window (PAW) for the retransmitted packet.

13. An analyzer in a System Under Test (SUT) comprising a computer processor including a computer readable medium having program code stored thereon, comprising:
   program code for searching a list of packets exchanged between a Source Device Under Test (Source DUT) and a Destination Device Under Test (Destination DUT) to measure a delay of the System Under Test (SUT), including program code for comparing a time stamp of a transmitted packet to a time stamp of a matching entry in the destination list, the matching entry corresponding to a retransmission of the transmitted packet to determine the delay associated with the transmitted packet;
   program code for outputting a quality of service statistic based on the determined delay in tangible form.

* * * * *